(12) United States Patent
Yoon et al.

(10) Patent No.: US 9,360,862 B2
(45) Date of Patent: Jun. 7, 2016

(54) PLC NETWORK EXTENSION SYSTEM

(75) Inventors: Geon Yoon, Uiwang-si (KR); Joon Seok Oh, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 305 days.

(21) Appl. No.: 13/550,370

(22) Filed: Jul. 16, 2012

(65) Prior Publication Data

US 2013/0044632 A1   Feb. 21, 2013

(30) Foreign Application Priority Data

Aug. 17, 2011   (KR) .................. 10-2011-0081694

(51) Int. Cl.
*G05B 19/418*   (2006.01)
*G05B 19/05*   (2006.01)

(52) U.S. Cl.
CPC .......... *G05B 19/4185* (2013.01); *G05B 19/052* (2013.01); *Y02P 90/04* (2015.11); *Y02P 90/18* (2015.11)

(58) Field of Classification Search
CPC ... G06F 13/4045; H04L 12/42; G05B 19/052; G05B 19/4185; G05B 2219/1109
USPC ............................................ 370/254; 710/62
See application file for complete search history.

(56) References Cited

U.S. PATENT DOCUMENTS 6,914,914 B1 *   7/2005   Flood et al. .................... 370/503
7,689,301 B2 *   3/2010   Araki et al. ...................... 700/81
8,452,843 B2 *   5/2013   Yabusaki et al. .............. 709/208
2007/0239907 A1 *   10/2007   Tu .................................... 710/62
2012/0179849 A1 *   7/2012   Mizutani .............. G05B 19/054
710/110

FOREIGN PATENT DOCUMENTS

| CN | 1719363 | 1/2006 |
| CN | 201170857 | 12/2008 |
| CN | 101592934 | 12/2009 |
| CN | 101872183 | 10/2010 |
| JP | 2002-108422 | 4/2002 |
| KR | 10-2004-0091925 | 11/2004 |

OTHER PUBLICATIONS

Baoyan Zhou, Hardware extension method of programmable logic controller. CN1719363, English translation from http://www.google.com/patents/CN1719363A?cl=en.*

Huawu Yu et al., Programmable logic controller, CN201170857, English translation from http://www.google.com/patents/CN201170857Y?cl=en.*

Korean Intellectual Property Office Application Serial No. 10-2011-0081694, Office Action dated Aug. 17, 2012, 3 pages.

The State Intellectual Property Office of the People's Republic of China Application Serial No. 201210271305.7, Office Action dated Apr. 14, 2014, 7 pages.

* cited by examiner

*Primary Examiner* — Un C Cho
*Assistant Examiner* — Fangyan Deng
(74) *Attorney, Agent, or Firm* — Lee Hong Degerman Kang & Waimey; Jonathan Kang; Jeffrey Lotspeich

(57) ABSTRACT

Provided is a PLC network extension system, the system including a basic base generating a control data for controlling a plurality of extension bases, generating a network frame using the control data, and transmitting the network frame to one extension base in the plurality of extension bases via a network cable, and the plurality of extension bases extracting a control data from the received network frame to control a pre-installed module based on the control data.

7 Claims, 6 Drawing Sheets

FIG. 1
(PRIOR ART)

| SLOT NUMBER | | 0 | 1 | 2 | 3 | 4 | 5 | 6 | 7 |
|---|---|---|---|---|---|---|---|---|---|
| POWER | CPU | P0000 ~ P003F | P0040 ~ P007F | P0080 ~ P011F | P0120 ~ P015F | P0160 ~ P019F | P0200 ~ P023F | P0240 ~ P027F | P0280 ~ P031F |

| SLOT NUMBER | | 0 | 1 | 2 | 3 | 4 | 5 | 6 | 7 |
|---|---|---|---|---|---|---|---|---|---|
| POWER | | P0640 ~ P067F | P0680 ~ P071F | P0720 ~ P075F | P0760 ~ P079F | P0800 ~ P083F | P0840 ~ P087F | P0880 ~ P091F | P0920 ~ P095F |

| SLOT NUMBER | | 0 | 1 | 2 | 3 | 4 | 5 | 6 | 7 |
|---|---|---|---|---|---|---|---|---|---|
| POWER | | P1280 ~ P131F | P1320 ~ P135F | P1360 ~ P139F | P1400 ~ P143F | P1440 ~ P147F | P1480 ~ P151F | P1520 ~ P155F | P1560 ~ P159F |

| SLOT NUMBER | | 0 | 1 | 2 | 3 | 4 | 5 | 6 | 7 |
|---|---|---|---|---|---|---|---|---|---|
| POWER | | P4480 ~ P451F | P4520 ~ P455F | P4560 ~ P459F | P4600 ~ P463F | P4640 ~ P467F | P4680 ~ P471F | P4720 ~ P475F | P4760 ~ P479F |

PLC NETWORK EXTENSION SYSTEM

Pursuant to 35 U.S.C. §119 (a), this application claims the benefit of earlier filing date and right of priority to Korean Patent Application No. 10-2011-0081694, filed on Aug. 17, 2011, the contents of which is hereby incorporated by reference in their entirety.

BACKGROUND OF THE DISCLOSURE

1. Field of Endeavor

The present disclosure relates to a PLC (Programmable Logic Controller), and more particularly to a PLC (Programmable Logic Controller) extension system.

2. Background

Although a factory system used to be operated by independent manipulation of machines and/or devices in automation facilities at a traditional industrial site, changes in the system are being required these days as modern industries become more complicated and diversified. That is, a device is required to complement the complicated and diversified operation, and therefore, a PLC (Programmable Logic Controller) system for directly controlling sites has been developed. To solve the difficulties, a programmable logic controller (PLC) is typically employed. The PLC generally includes a basic module and a wide variety of expansion modules.

That is, industrial automation and control systems are known and are in use for controlling factory automation and the like. Such systems typically include various components that cooperate to monitor and control a process and/or system (e.g., a manufacturing process or a machine). A programmable controller is typically a central feature of a control system. For example, a typical control system includes one or more PLCs (programmable logic controllers) that coordinate with sensors, semiconductor power electronic circuits, power supplies, motor starters, relays, and so forth to control features and actions throughout an associated system or process. In operation, a typical PLC (programmable logic controller) examines a series of inputs reflecting the status of a controlled process and changes outputs affecting control of the process. For example, a programmable logic controller may receive an analog signal from a sensor and adjust an output to an actuator depending on a value of the signal and associated logic programmed in a memory of the programmable controller.

A programmable logic controller (PLC) applied to various fields such as automation of factory facilities in industries may include a base, power module, a central processing unit (CPU) module including a CPU, an input module that receives a signal inputted from a sensor or switch, a high-speed counter module that receives a signal inputted from an encoder, an output module that transfers a control signal to a motor or valve as a control object, a communication module, a proportional integral differential (PID) control module, a positioning module, and the other modules.

One base may be typically mounted with one power module, a communication module in a scope allowable by a CPU module and the base, an input/output module and a special module. Furthermore, one base may be mounted with one power module, which means that the number of modules mountable at the base may be restricted by the power suppliable by the power module. A PLC extension system using a basic base (10) and extension bases (11 to 1N) is provided to solve the restriction and to effectively extend the system as illustrated in FIG. 1.

The FIG. 1 illustrates a PLC extension system according to prior art. All extension bases are connected by daisy chain configuration using extension cables (21, 22, 23, 2N) started from the basic base (10). A PLC network extension system, as illustrated in FIG. 1, is formed by the basic base (10) and n numbers of extension bases (11 to 1N) that are mutually connected.

The PLC network extension system of serial cable type according to the prior art is advantageous in that buses are directly connected by cables to directly control modules of extension bases (11 to 1N) from a CPU module of the basic base (10). However, there is also a disadvantage in that only the extension bases can be controlled at a proximate distance because of restriction in connecting the cables.

That is, there is a severe restriction in distance because a parallel signal transmission is employed using extension cables. The extension cables according to the prior art are formed in a bundle of lines for transmitting a parallel signal necessary for extension base, and the parallel signal that is transmitted via cables may create a restriction in distance due to electromagnetic problem.

Concomitant with sophistication of modern industries and large volume properties of information, flexible extension of PLC system and calculation speed have come to be very important. However, the PLC network extension system according to the prior art thus described has a disadvantage in that there is a distance restriction and complexity of installation, set-up and programming as a programmer is required to understand the network system. Another disadvantage is that network load increases due to control message of main CPU to greatly reduce performance of the scan-based control system as system grows extended.

Accordingly, there is room for improvement in the PLC network extension system.

SUMMARY

The present disclosure has been made to solve the foregoing disadvantages/problems of the prior art and therefore an object of certain embodiments of the present invention is to provide a PLC network extension system that is free from distance restriction.

Another object of the present invention is to provide a PLC network extension system having best and optimal resources efficiency and performance.

In one general aspect of the present disclosure, there is provided a PLC (Programmable Logic Controller) network extension system in which a basic base and a plurality of extension bases are connected in parallel via a network cable, wherein the basic base comprises a controller for generating control data for controlling the plurality of extension bases, and an extension manager unit generating a network frame using the control data and transmitting the network frame to a first extension base of the plurality of extension bases via the network cable, wherein each of the plurality of extension bases comprises an extension driver unit extracting a control data from the received network frame to control a pre-installed module based on the control data, wherein the first extension base receives the network frame from the extension manager unit to transmit the network frame to the parallel-connected plurality of extension bases, wherein the parallel-connected plurality of extension bases transmit the network frame successively, and wherein a second extension base having received the network frame finally transmits the network frame to the extension manager unit.

Preferably, but not necessarily, the basic base further comprises a first connector for connecting the extension manager unit to the first extension base.

Preferably, but not necessarily, each of the plurality of extension bases further comprises a second connector for connecting the extension manager unit of the basic base or the parallel-connected extension base.

Preferably, but not necessarily, the extension manager unit receives the network frame from the second extension base to determine whether the network frame is developed with an error.

Preferably, but not necessarily, the controller individually generates a control data for controlling the plurality of extension bases relative to the plurality of extension bases.

Preferably, but not necessarily, the extension manager unit generates the network frame using the control data individually generated relative to the plurality of extension bases.

Preferably, but not necessarily, the extension manager unit generates the network frame comprising a destination flag notifying a control data relative to an extension base in the plurality of extension bases.

Preferably, but not necessarily, the extension driver unit of the plurality of extension bases extracts a control data relative to a relevant extension base in the network frame.

The PLC network extension system according to the present disclosure has an advantageous effect in that distance and performance restrictions are complemented through a program interface identical to an extension base system of a serial cable method.

BRIEF DESCRIPTION OF THE DRAWINGS

The drawing figures depict one or more exemplary embodiments in accordance with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIG. 1 is a block diagram illustrating a PLC network extension system according to prior art;

DETAILED DESCRIPTION

Figure 2:
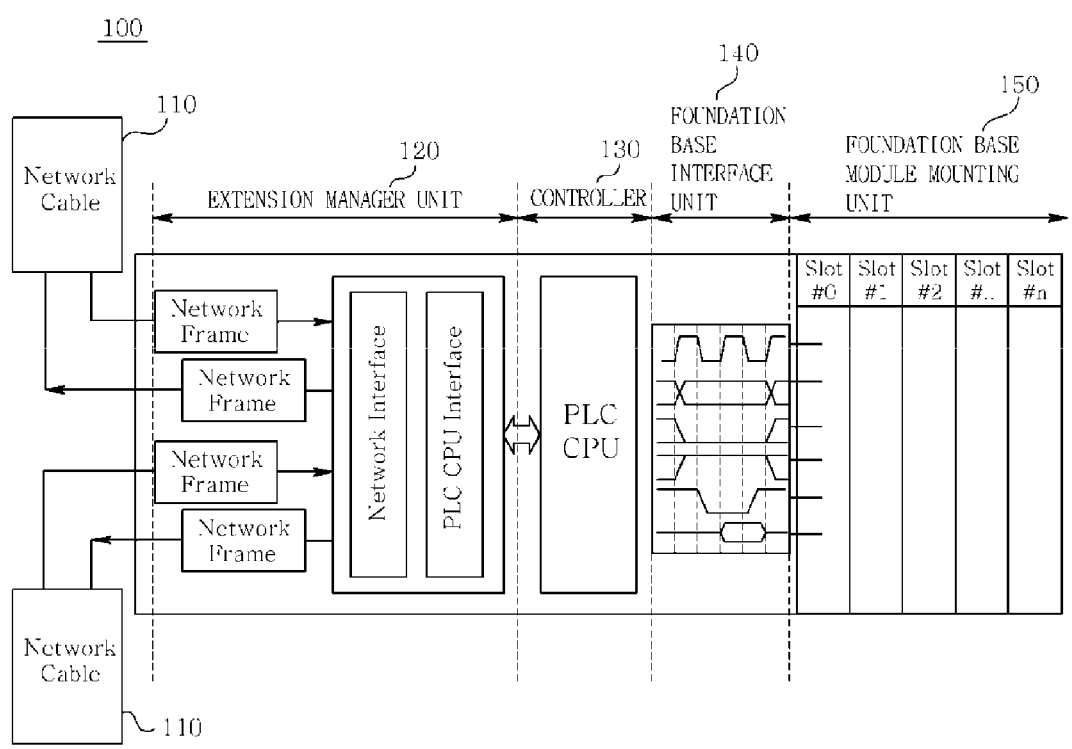
FIG. 2 is a block diagram illustrating a structure of a basic base (100) included in a PLC network extension system according to an exemplary embodiment of the present disclosure.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a PLC network extension system according to the present disclosure will be described in detail with reference to the accompanying drawings.

Referring to FIG. 2, a basic base (100) according to the present disclosure includes a network cable (110), an extension manager unit (120), a controller (130), a basic base interface unit (140) and a basic base module mounting unit (150).

The network cable (110) serves to connect the basic base (100) to at least one extension base (described later). The basic base (100) may separately include a connector (not shown) to connect the network cable (110). Meanwhile, although the network cable (110) is exemplified by way of Ethernet cable, the network cable (110) is not limited to the Ethernet cable, and it should be well appreciated by skilled in the art that any type of cables capable of forming a network may be utilized.

The controller (130) functions to generate a control data for controlling various modules and bases. In addition, the controller (130) may transmit data to the extension base, or manage or diagnose the extension base. The controller (130) may generate an individual control data relative to a plurality of extension bases. That is, because not all the plurality of extension bases are formed with same extension modules, information relative to extension modules installed by the extension bases may be perceived in advance, and a control data for each of the plurality of extension bases may be generated.

The extension manager unit (120) receives a control data generated by the controller (130) to prepare a network frame for transmitting the control data to the extension base through the network cable (110). That is, the network frame is a frame including the control data and a data capable of being received and transmitted of the control data through the network cable.

In a case the controller (130) generates an identical control data relative to the plurality of extension bases; the extension manager unit (120) may prepare the network frame free from a destination extension base. Meanwhile, in a case the controller (130) generates an individual control data relative to the plurality of extension bases; the extension manager unit (120) may generate a network frame including a destination flag notifying a control data relative to an extension base in the plurality of extension bases when the network frame is generated.

The basic base interface unit (140) uses the control data generated by the controller (130) to individually control a module connected to the basic base (100). That is, the module connected to the basic base (100) is operated by the control data inputted from the controller (130) through the basic base interface unit (140).

The basic base module mounting unit (150) is a configuration capable of mounting all the modules connected to the basic base (100). That is, the basic base module mounting unit (150) physically connects various modules to the basic base (100). For example, although not depicted in FIG. 2, a communication module (not shown) having a function of promoting communication with outside devices, an input/output module (not shown) for controlling input/output may be mounted on the basic base module mounting unit (150). However, it should be well appreciated by skilled in the art that the given configuration is just an example and other configurations may be applied.

Although the abovementioned description has explained the extension manager unit (120) as hardware apart from the controller (130), it should be well appreciated by skilled in the art that, as long as the controller (130) is mounted with a network interface function, the extension manager unit (120) may be included in the controller (130).

Next, an extension base (200) operating in association with the basic base (100) thus described will be described in detail with reference to FIG. 3. The PLC network extension system according to the present disclosure may include a plurality of extension bases, and FIG. 3 illustrates one of the extension bases.

Figure 3:
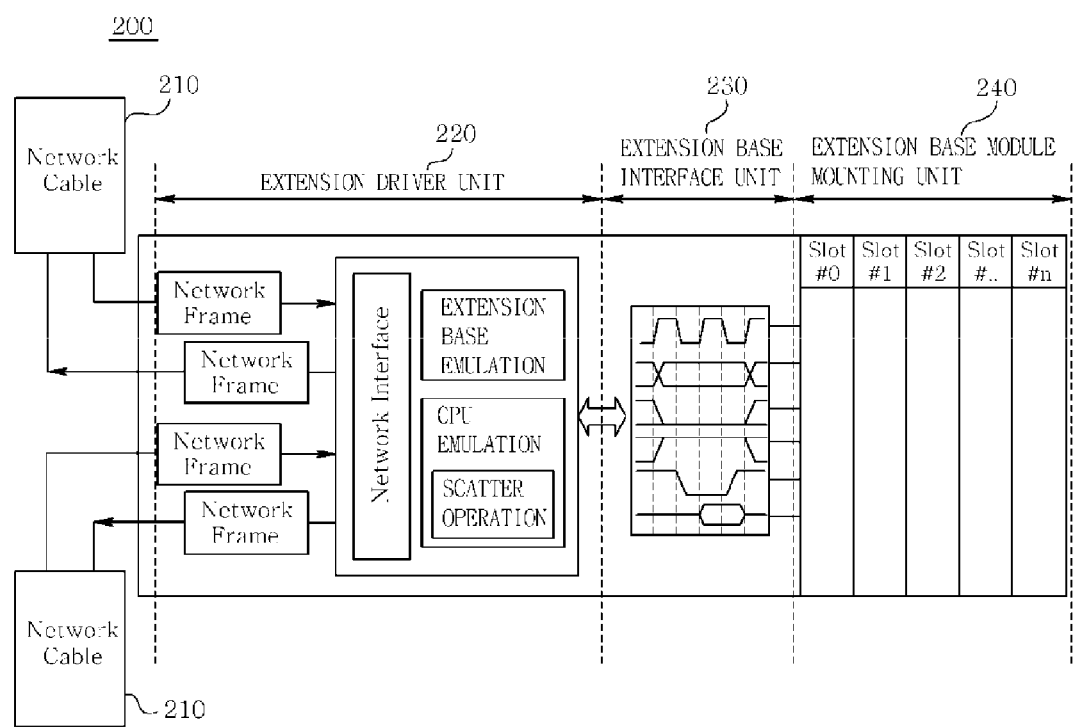
FIG. 3 is a block diagram illustrating a structure of an extension base (200) included in a PLC network extension system according to an exemplary embodiment of the present disclosure.

FIG. 3 is a block diagram illustrating a structure of an extension base (200) included in the PLC network extension system according to an exemplary embodiment of the present disclosure.

Referring to FIG. 3, the extension base (200) according to the present disclosure includes a network cable (210), an extension driver unit (220), an extension base interface unit (230) and an extension base module mounting unit (240).

The network cable (110) serves to connect the extension base (200) to the basic base (100). The extension base (200) may separately include a connector (not shown) to connect the network cable (210). Meanwhile, although the network cable (210) is exemplified by way of Ethernet cable, the network cable (210) is not limited to the Ethernet cable, and it should be well appreciated by skilled in the art that any type of cables capable of forming a network may be utilized.

The extension driver unit (220) extracts a control data from the network frame transmitted from the extension manager unit (120) of the basic base (100). In a case the network frame includes a destination flag, the extension driver unit (220) may extract only the control data relative to a relevant extension base (200). Furthermore, various modules mounted at the extension base module mounting unit (240) are controlled based on the extracted control data. As explained, the network frame is a frame generated by using the control data provided by the controller (130) of the basic base (100), and includes signals received through the network frame for controlling various modules.

The extension base interface unit (230) analyzes various signals of the control data extracted from the extension driver unit (220) to transmit a signal for controlling each module mounted at the extension base module mounting unit (240). The extension base module mounting unit (240) is a configuration capable of mounting all modules connected to the base. That is, the extension base module mounting unit (240) physically connects various modules to the extension base.

According to the configuration thus explained, the extension base (200) can receive a control command from the basic base (100) to completely control the mounted modules, dispensing with dependency on the basic base (100). Furthermore, the extension driver unit (220) can perform a scatter operation that is to be carried out by the controller (130) of the basic base (100), and can enhance the performance of an entire system by dispensing with pause time and by performing an operation capable of performing even without a command or a data from the controller (130) of the basic base (100).

Figure 4:
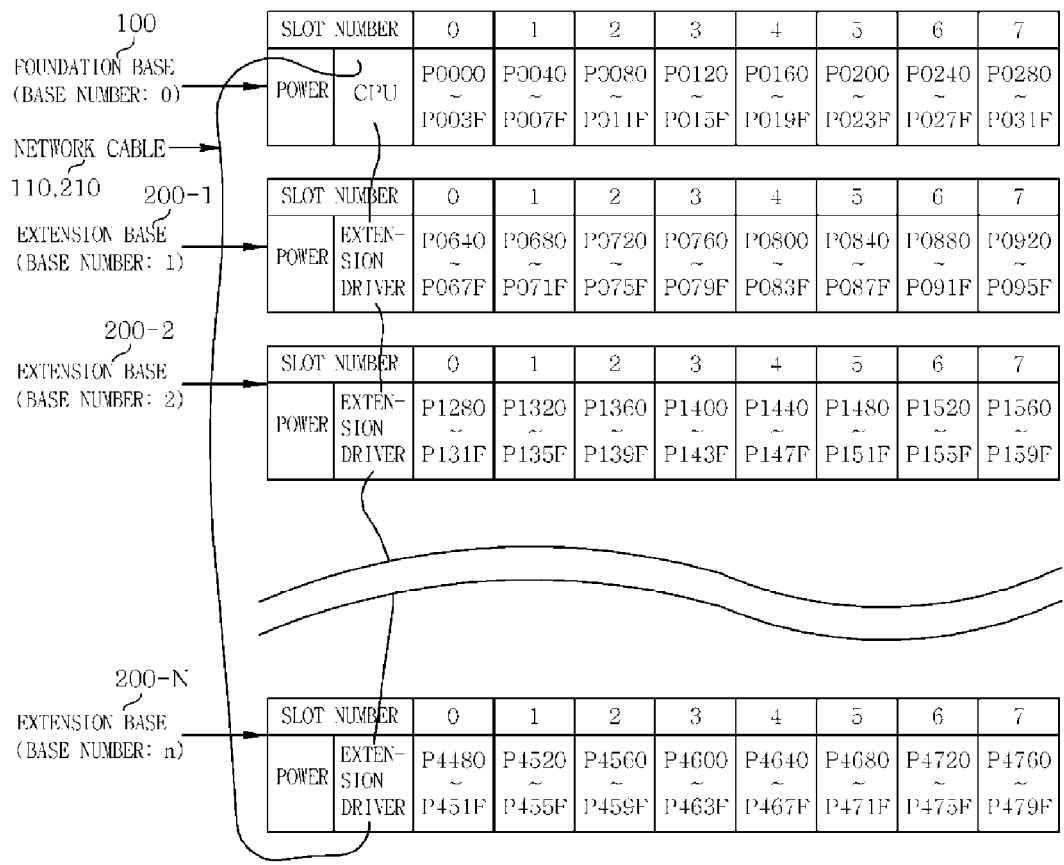
FIG. 4 is a schematic view illustrating an extension driver memory mapping in a PLC network extension system according to an exemplary embodiment of the present disclosure.

FIG. 4 is a schematic view illustrating an extension driver memory mapping in a PLC network extension system according to an exemplary embodiment of the present disclosure.

Referring to FIG. 4, the PLC network extension system according to the present disclosure includes one basic base (100) and a plurality (N) of extension bases (200-1 to 200-N). The basic base (100) is connected to at least one extension base (200-1) through the network cables (110 and 210). Furthermore, the extension base (200-1) connected to the basic base (100) is connected in parallel to each of the plurality of extension bases (200). That is, the plurality of extension bases are connected in parallel in such a way that the extension base (200-1) and the extension base (200-2) are connected by the network cable (210), and the extension base (200-2) and the extension base (200-3) are connected by the network cable (210).

At this time, what the network cables (110, 210) connect is the extension manager unit (120) of the basic base (100) and the extension driver unit (220) of the extension base (200). That is, the extension manager unit (120) of the basic base (100) is connected to the extension driver unit (220-1) of the extension base (200) to transmit the network frame. Likewise, the network frame transmitted to the extension base (200-1) can be continuously transmitted to other extension bases (200-2, 200-N).

Meanwhile, the extension driver unit (220-N) of the last extension base (200-N) is connected to the extension manager unit (120) of the basic base (100) in addition to the extension driver unit {220-(N−1)}, whereby the transmitted network frame may be transmitted to the extension manager unit (120) again to determine whether there is generated an error on the network frame. That is, the extension manager unit (120) may be connected to another extension base (200-N) in addition to the extension base (200-1) that has transmitted the network frame to determine whether there is generated an error on the network frame.

The network frame is effectively transmitted to the plurality of extension bases (200-1, 200-2, 200-N) using the mapping thus described, and the extension driver unit (220) mounted at each extension base (200-1 to 200-N) can perform the scatter operation that is supposed to be processed by the controller (130) of the basic base (100), and the operation that can be performed in advance without a command or a data from the controller (130) of the basic base (100) can be carried out to dispense with the pause time, whereby an entire system can be enhanced in performance.

Furthermore, an improved performance of the entire system can be induced by determining whether an error has been generated on the network frame through the network cables (110 and 210).

Figure 5:
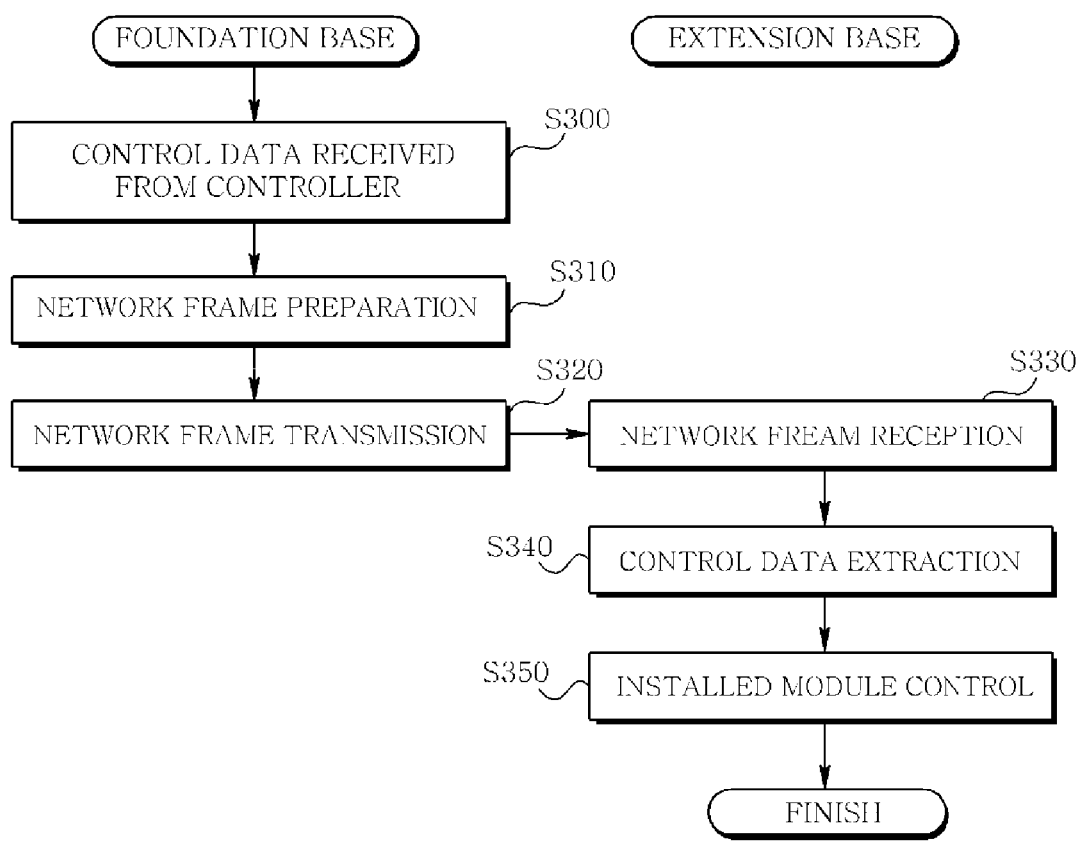
FIG. 5 is a flowchart illustrating a flow of network extension method according to an exemplary embodiment of the present disclosure.

FIG. 5 is a flowchart illustrating a flow of network extension method according to an exemplary embodiment of the present disclosure.

First, the extension manager unit (120) of the basic base (100) receives a control data from the controller (130) (S300). Thereafter, the extension manager unit (120) prepares a network frame including a control data (S310), and transmits the network frame to the extension base (200) (S320). The transmitted network frame is received by the extension base (200) (S330), and the extension driver unit (220) mounted at the extension base (200) extracts a control data included in the network frame (S340). At this time, in a case the network frame contains a destination flag, the extension driver unit (220) may extract only a control data related to thereto. The extension base (200) controls various mounted modules according to the extracted control data.

Furthermore, although not illustrated, the extension manager unit (120) of the basic base (100) may receive the network frame from the final extension base (200-N) to check whether an error has been generated on the network frame transmitted by the extension manager unit (120). As a result, the extension driver unit (220) can perform the scatter operation that is supposed to be carried out by the controller (130) of the basic base (100), and the operation that can be performed in advance without a command or a data from the controller (130) of the basic base (100) can be carried out to dispense with the pause time, whereby an entire system can be enhanced in performance.

Figure 6:
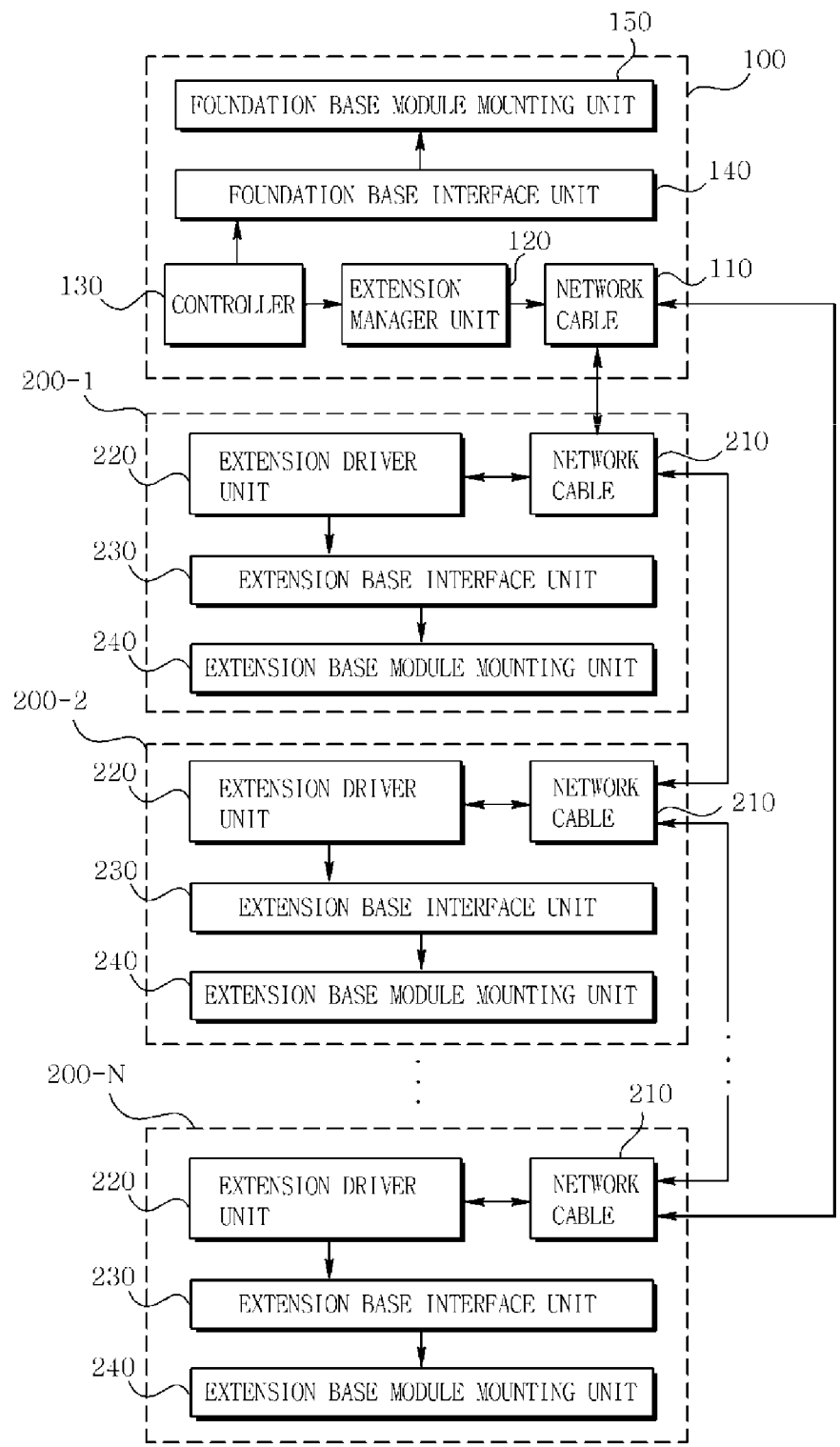
FIG. 6 is a block diagram illustrating an overall structure of a network extension system according to an exemplary embodiment of the present disclosure.

FIG. 6 is a block diagram illustrating an overall structure of a network extension system according to an exemplary embodiment of the present disclosure.

Because the operation of the network extension system has been already explained as above, FIG. 6 will briefly explain a flow of control data and structural connection status.

Referring to FIG. 6, at least one extension base (200-1) and the basic base (100) are connected via network cables (110 and 210). Although the network cable (210) is exemplified by way of Ethernet cable, the network cable (210) is not limited to the Ethernet cable, and it should be well appreciated by skilled in the art that any type of cables capable of forming a network may be utilized.

The controller (130) of the basic base (100) may generate a control data for controlling modules mounted at the basic base module mounting unit (150) and transmit a signal of the control data via the basic base interface unit (140). As a result, the basic base (100) can control the mounted modules.

Furthermore, the controller (130) may generate a control data for controlling the modules mounted at the plurality of extension bases (200) and transmit the control data to the extension manager unit (120). The controller (130) may generate an individual control data relative to the plurality of extension bases (200). The control data for controlling the plurality of extension bases (200) is transmitted to the extension manager unit (120) from the controller (130) to be generated as a network frame by the extension manager unit (120).

The extension manager unit (120) may generate a destination flag relative to the individual control data and allow the destination flag to be included in the network frame, in a case the network frame is generated and in a case the control data generated by the controller (130) is an individual control data relative to the plurality of extension bases (200).

The network frame thus generated is transmitted to one (200-1) of the plurality of extension bases (200) through the network cables (110 and 210). Furthermore, the extension base (200-1) having received the network frame from the basic base (100) may transmit the network frame to the parallel-connected extension base (200-2) via the network cable (210), and may transmit the network frame generated by the basic base (100) to the plurality of extension base (200).

Furthermore, the extension base (200-N) having finally received the network frame may re-transmit the network frame to the extension manager unit (120) of the basic base (100). The extension manager unit (120) having received the network frame may check whether there is generated an error in the course of transmission of the network frame.

Each extension base (200) includes the extension driver unit (220), where the extension driver unit (220) extracts a control data from the received network frame. In a case the network frame contains the individual control data for each extension base (200), that is, in a case a destination flag is contained, each extension base (200) may extract its own control data only. The extracted control data is transmitted to the extension base interface unit (230) to be used for controlling the modules mounted on each extension base module mounting unit (240).

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A PLC (Programmable Logic Controller) network extension system comprising:
   a basic base and a plurality of extension bases connected in parallel via a network cable,
   wherein the basic base comprises:
   a controller for generating first control data for controlling the plurality of extension bases and for generating second control data for controlling a module connected to the basic base, and
   an extension manager hardware generating a network frame comprising the first control data and transmitting the network frame to a first extension base of the plurality of extension bases via the network cable, and a basic base interface hardware for individually controlling the module connected the basic base using the second control data, wherein each of the plurality of extension bases comprises an extension base module hardware for mounting various modules, and an extension driver hardware extracting the first control data from the received network frame to control the modules mounted on the extension base module mounting hardware based on the first control data, and an extension base interface hardware for respectively controlling modules mounted on the extension bases by analyzing various signals of the first control data extracted from the extension driver hardware, and wherein the first extension base receives the network frame from the extension manager hardware to control the modules mounted on the extension base module mounting hardware of the first extension base and transmit the network frame to the parallel-connected plurality of extension bases that are free from a distance restriction, wherein the parallel-connected plurality of extension bases transmit the network frame successively, and wherein a second extension base having received the network frame finally transmits the network frame to the extension manager hardware, wherein the extension manager hardware receives the network frame from the second extension base to determine whether the network frame received from the second extension base is developed with an error, wherein the network frame received from the second extension base is the network frame generated and transmitted by the extension manager hardware, and wherein the extension driver hardware includes an extension base emulation and a CPU emulation to performs a scatter operation supposed to be carried out by the controller, and performs an operation capable of being performed in advance without a command or data from the controller.

2. The PLC network extension system of claim 1, wherein the basic base further comprises a first connector for connecting the extension manager hardware to the first extension base.

3. The PLC network extension system of claim 1, wherein each of the plurality of extension bases further comprises a second connector for connecting the extension manager hardware of the basic base or the parallel-connected extension base.

4. The PLC network extension system of claim 1, wherein the controller individually generates a third control data for controlling the plurality of extension bases relative to the plurality of extension bases.

5. The PLC network extension system of claim 4, wherein the extension manager hardware generates the network frame using the third control data individually generated relative to the plurality of extension bases.

6. The PLC network extension system of claim 5, wherein the extension manager hardware generates the network frame comprising a destination flag notifying the third control data relative to an extension base in the plurality of extension bases.

7. The PLC network extension system of claim 6, wherein the extension driver hardware of the plurality of extension bases extracts the third control data relative to a relevant extension base in the network frame.

* * * * *